Feb. 7, 1961  R. C. DARNELL  2,970,698
FILTERING DEVICE
Filed March 28, 1958
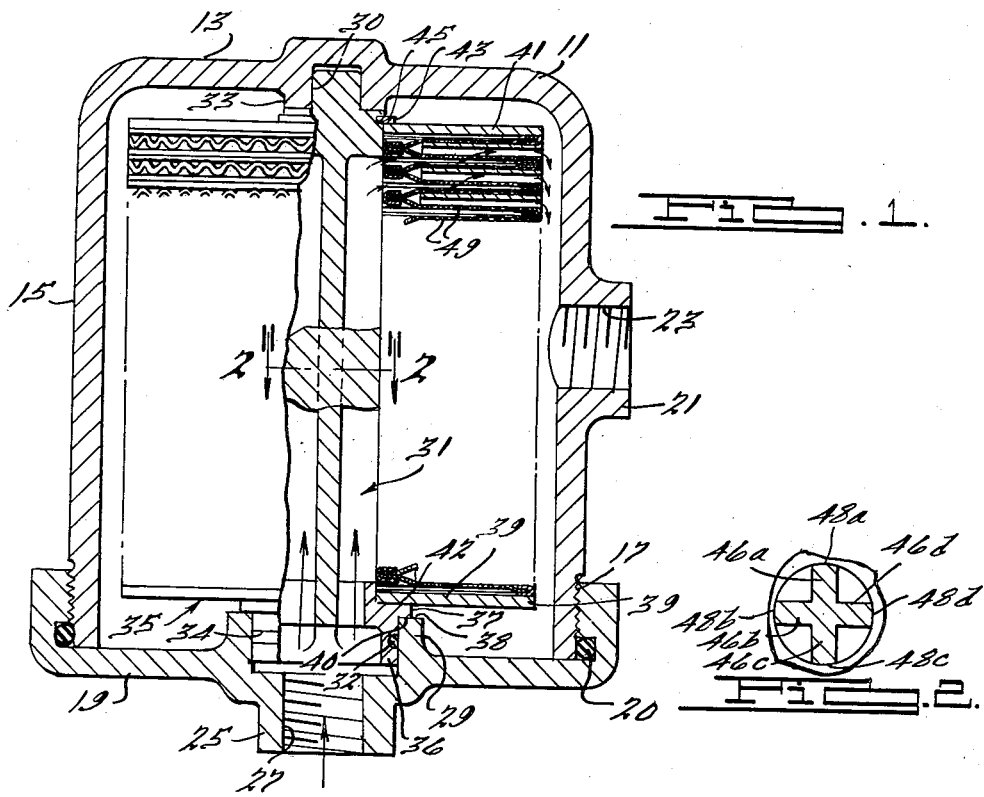
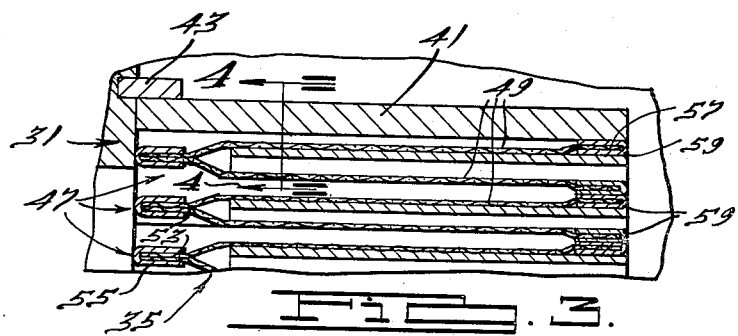
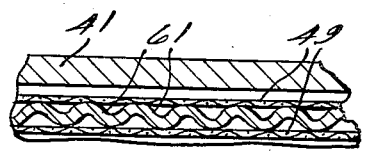
INVENTOR.
Rex C. Darnell
BY
Harness, Dickey & Pierce
ATTORNEYS.

United States Patent Office 2,970,698
Patented Feb. 7, 1961

2,970,698
FILTERING DEVICE

Rex C. Darnell, Dexter, Mich., assignor to Dynamic Filters, Inc., Detroit, Mich., a corporation of Michigan Filed Mar. 28, 1958, Ser. No. 724,715

2 Claims. (Cl. 210—347)

This invention relates to filtering devices and more particularly to filtering devices of the type comprising a housing having a stack of sandwich or wafer type filter units positioned therein for filtering or straining contaminants from the oil or fuel of internal combustion engines, jet engines, hydraulic mechanisms, or from any fluid flow system where it is desired to remove contaminants from the fluid.

It is an object of the present invention to provide a filtering device incorporating a maximum amount of filtering or screen surface area within a housing of a given size and which will remain effective over a long period of use without becoming clogged or having its efficiency seriously impaired prior to substantially complete contaminant coverage of all the filtering elements in the device.

It is another object of the present invention to provide a filtering device of the above character which may be easily disassembled for maintenance and which may be cleansed of all contaminants accumulated in convenient locations within the unit.

It is a further object of the present invention to provide a filtering device having internal channels for transmitting contaminated fluid to the filter or screen elements which are of such size and configuration as to be substantially free from premature clogging due to the buildup of contaminant therein.

Still another object of the present invention is to provide a filtering device of the above character utilizing fine wire mesh filter screens or other filtering elements of a similar delicate nature wherein the screens are adequately supported against the flow of fluid therethrough so as not to become torn, damaged, or deformed to an inoperable position by the flow of fluid therethrough.

Other objects and advantages of the present invention will become apparent from the following detailed description taken in conjunction with the accompanying drawings wherein:

Figure 1 is a sectional view of a filtering device embodying the features of the present invention, one-half of the filter unit stack being shown in elevation;

Fig. 2 is a sectional view of the structure illustrated in Fig. 1 taken along the lines 2—2 thereof;

Fig. 3 is an enlarged fragmentary view of the structure illustrated in Fig. 1; and Fig. 4 is a sectional view of the structure illustrated in Fig. 3 taken along the line 4—4 thereof.

Referring to Fig. 1 the filtering device comprises a generally cup-shaped housing 11 having a circular end wall 13 and an annular side wall 15. The side wall 15 is exteriorly threaded at 17 adjacent its forward end to threadably receive cap-shaped end cover member 19. The side wall 15 is provided with a boss 21 located at approximately the center of its length, which is bored to provide an outlet port 23 communicating with the interior of the housing 11. A boss 25 is formed at the center of the cover member 19 and is bored to provide an inlet port 27 also communicating with the interior of the housing 11. Disposed around the port 27 on the inner side of the cover member 19 is an annular flange 29 adapted to support one end of a central supporting spindle 31, which is supported at its other end in a bore 30 formed in a boss 33 located on the inner side of the rear wall 13. The spindle 31 acts as a supporting member for a stack of filtering units, generally indicated at 35, and also provides means for channeling the flow of fluid throughout the length of the filter stack 35, as will be hereinafter described.

The spindle 31 is provided with a hollow sleeve portion 36 at its forward end which sealingly registers within the flange 29 of the cover member 19, to direct the flow of incoming fluid longitudinally along the spindle 31. An O-ring 32 located in a groove 34 formed in the periphery of the sleeve portion 36 provides a seal between the sleeve portion 36 and the cover 19. The inner terminus of the sleeve portion 36 is defined by an annular shoulder 37 which abuts an end wall 38 of the flange 29 at its one side 40 to secure the spindle 31 against lengthwise movement. The opposite side 42 of the annular shoulder 37 abuts an annular retaining washer 39 which is of a similar outside diameter as the filter stack 35 and which supportingly engages the spindle 31 at its inside diameter. A similar annular retaining washer 41 is disposed at the opposite end of the filter stack 35 and is held thereon by a lock ring 43 fastened in a groove 45 formed in the rear end of the spindle 31.

That portion of the spindle 31 extending between its forward and rearward ends is of the cross section indicated in Fig. 2, that is, the bulk of the length of the spindle 31 comprises four longitudinally extending ribs 46a, 46b, 46c, and 46d which are radially disposed relative to the axis of spindle 31 and which are spaced 90° apart. The circumferential peripheries 48a, 48b, 48c and 48d of the ribs 46 are disposed on a common circular cylinder and are adapted to support and position the filter stack 35 in the manner to be described. The annular sleeve 36 at the forward end of the spindle 31, being centrally bored, provides direct communication from the inlet port 27 to the four sector shaped channels formed between each adjacent pair of ribs 46a, 46b, 46c, and 46d, which permit the fluid to flow the entire length of the filter stack and pass into the filter stack at any point therealong.

The filter stack 35, which is held in assembled relationship between the retaining washers 39 and 41, comprises a plurality of separate centrally open generally disc shaped filter units 47 disposed side by side along the ribbed portion of the spindle 31 in a manner permitting the flow of fluid between adjacent units. Each filter unit 47 comprises a pair of identical annular filtering elements or media 49, such as fine mesh wire screen or the like, spaced apart by a semi-rigid corrugated annular spacer 51 interposed therebetween. The inside diameter of the spacer 51 is larger than the inside diameter of the filter elements 49, permitting the filter elements to be bent into engagement with one another adjacent their inner diameters, as indicated at 53. Frictionally retaining the filtering elements 49 together around this location is an annular inner binder 55 of U-shaped cross section. The outer peripheries 57 of the filtering elements 49 are offset slightly away from the spacer 51, permitting each to be fitted with an annular outer binder 59, also of U-shaped cross section.

When the filter units 47 are stacked on the spindle 31 with the retaining washers 39 and 41 forcing the units together, the only contact between filter units occurs at the outer binders 59. Thus, an outer binder of one filter unit will abut an outer binder of its adjacent filter unit, maintaining the adjacent filtering elements 49 of the two units in spaced relationship for the flow of fluid therebetween from the spindle 31. Furthermore, the engagement of the outer binders 59 of adjacent units form a seal between units preventing the flow of fluid completely between adjacent units without passing through a filter ing element. The inner binders 55 engage the peripheries 48 of the spindle ribs 46 thereby supporting and locating the filter unit.

The spacer 51 which may be constructed from aluminum or any suitably semi-rigid material is corrugated, fluted, or crimped back and forth to define a series of channels 61 disposed radially with respect to the axis of the spindle 31. This configuration is best seen in Fig. 4 or the left-hand side of Fig. 1 in the drawings. Each corrugation or channel 61 is open to an adjacent screen 49 to collect fluid flowing through the screen and direct it to the annular chamber formed between the filter stack 35 and the inside surface of the housing side wall 15. The outer periphery of the spacers 51 is completely open and thus the flow of fluid out of the filter stack 35 from the center of each filter unit 47 is unimpeded. When the filter units 47 are stacked on the spindle 31, the lock ring 43 is so positioned as to hold the filter stack under a compressive force between the retaining washers 39 and 41. The individual units are pressed together just enough to inwardly deflect the corrugated spacers one or two thousandths of an inch, which is not enough to permanently deform them, yet is sufficient to create a force urging the abutting outer binders 59 into tight engagement. This compression force serves to prevent abutting outer binders 59 from parting under the influence of high fluid pressures. It also prevents shifting of filter units under vibration.

In the operation of the filtering device constituting the present invention, oil, fuel or any other fluid to be filtered is directed through the inlet port 27 of the cover plate 19, generally under pressure from a pump in the delivery system. The fluid flows from the port 27 through the sleeve 36 and down the sector shaped channels defined by adjacent walls of the ribs 46 and the aligned inner diameters of the filter units 47. From these channels the fluid is then free to flow into the spaces between adjacent filter units as illustrated by the arrows in Fig. 1. Inasmuch as the outer binders 57 close the exit between adjacent filter units at their peripheries the fluid will then flow through the filter screens or elements 49 and is thereby strained of its contaminants. After passing through the filter elements 49 the fluid is directed along the corrugated channels 61 to the annular chamber between the exterior of the filter stack 35 and the inner surface of the housing side wall 15. From this location the fluid flows out of the housing 11 through the outlet port 23.

With the continuous flow of fluid through the filtering device those contaminants which are strained from the fluid will accumulate on the filter elements or screens 49 on the outer sides thereof between adjacent filter units 47. It will be noted that when the surface of one filtering screen 49 becomes covered with contaminants the fluid is still free to flow through the remaining unobstructed filter screens, which process will continue until all filter screens are completely obstructed or covered with contaminant, at which time the filter should be cleaned.

The filtering device of the present invention may be conveniently cleaned of accumulated contaminants by unscrewing the end cover member 19 and removing the spindle 31 having the filter stack 35 secured thereon. After removal of the lock ring 43 and retaining washer 41 the individual filter units 47 may be lifted off of the spindle 31 one at a time for cleaning. As has been pointed out, all of the contaminant is accumulated on the exterior of the filter screens 49 where it may be easily washed away or otherwise removed during the cleaning operation. Were the contaminant positioned within an individual filter unit 47 the process of cleaning the filter units for reuse would be extremely difficult and time consuming and there would be a much greater chance of damaging the filter units during the cleaning operation.

As the fluid enters the filtering device it is assured a free flow throughout the length of the housing 11 by virtue of the large channels formed between the spindle ribs 46. The construction of the ribs 46 assures an adequate supply of fluid through all the filtering screens 49 and eliminates the use of any small apertures or ports which might become clogged or obstructed during use. It will also be appreciated that the flow of fluid through the individual filter screens 49 is always from the outside of the filter unit 47 with the filter screen 49 supported against the flow by the spacer 51. In this manner the spacer 51, which is of rigid and sturdy construction affords support to the filter screen, which is constructed from fragile material and which would be subject to being torn if not adequately supported. Furthermore the flow of fluid always forces the screens 49 against their supporting spacers 51 and the screens are not subject to being "blown" or forced away from their spacers against an adjacent screen, in which position the screens would cease to perform their intended function.

While it will be apparent that the preferred embodiment herein demonstrated is well calculated to fulfill the objects above stated, it will be appreciated that the invention is susceptible to modification, variation and change without departing from the proper scope or fair meaning of the subjoined claims.

What is claimed is:

1. In a filtering device, a housing having fluid inlet and outlet ports, a spindle in said housing, a plurality of centrally apertured filtering units stacked in said housing on said spindle with the apertures thereof in communication with each other and with one of said ports, each of said filter units comprising a pair of centrally apertured filtering elements spaced by a rigid apertured spacer member interposed therebetween, the filtering elements of each filter unit being joined at their inner peripheries within the aperture of their associated spacer member, each of said spacers being corrugated to provide a series of channels disposed radially of said spindle and extending to the outer periphery of the filter unit, means associated with the outer peripheries of said filter units operable to space the adjacent filtering elements of adjacent filter units apart and prevent the flow of unfiltered fluid therethrough whereby fluid entering said one port is free to flow through the apertures of said filter units, between said filter units, through the filtering elements into the channels of said spacers and thence out of the filter unit stack to the other of said ports.

2. In a filtering device, a housing having fluid inlet and outlet ports, a plurality of centrally apertured filtering units stacked in said housing with the apertures thereof in communication with each other and with one of said ports, each of said filtering units comprising a pair of centrally apertured filtering elements and a centrally apertured corrugated spacer member of substantially uniform thickness having a plurality of spaced grooves extending radially outwardly therefrom interposed between said filtering elements, an inner rigid binding member maintaining said filtering elements in abutting relationship adjacent the inner peripheries thereof and within the aperture of said spacer member, and means associated with the outer peripheries of said filter units operable to space the adjacent filter elements of adjacent filter units apart and prevent the flow of unfiltered fluid thereby.

References Cited in the file of this patent

UNITED STATES PATENTS

| | | |
|---|---|---|
| 405,406 | Gasquet | June 18, 1899 |
| 2,088,199 | Gleason | July 27, 1937 |
| 2,154,565 | Fife | Apr. 18, 1939 |
| 2,426,618 | Klein | Sept. 2, 1947 |
| 2,597,235 | Ericson | May 20, 1952 |
| 2,615,574 | Kraucklauer | Oct. 28, 1952 |
| 2,863,561 | Just et al. | Dec. 9, 1956 |